Sept. 16, 1952     L. F. R. FELL ET AL     2,610,526
TRANSMISSION GEARING
Filed April 25, 1949     3 Sheets-Sheet 1
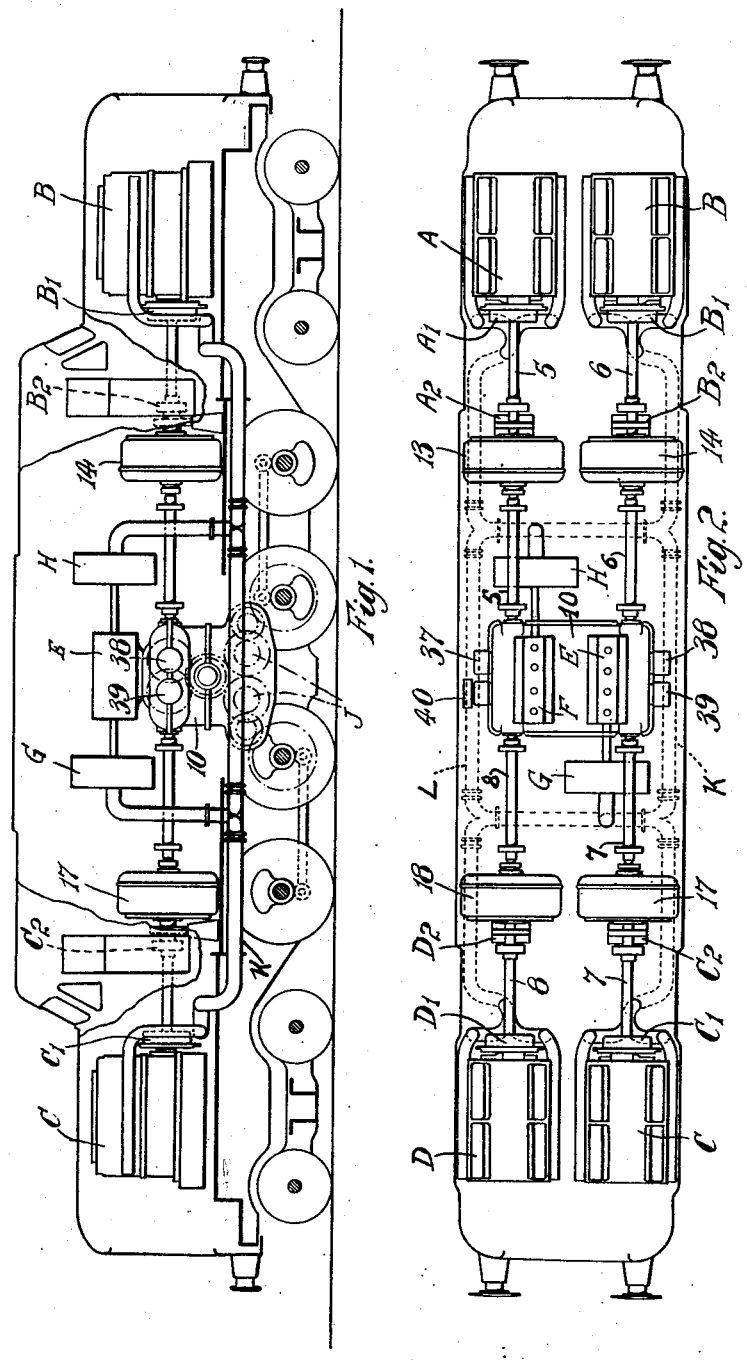

Sept. 16, 1952    L. F. R. FELL ET AL    2,610,526
TRANSMISSION GEARING
Filed April 25, 1949    3 Sheets-Sheet 2
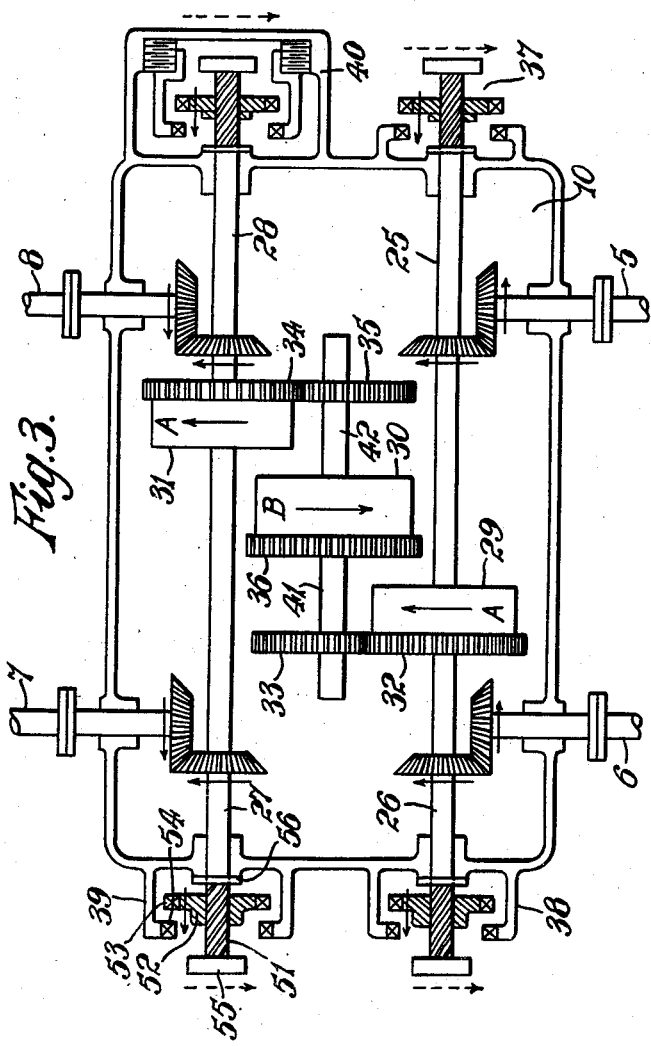

Sept. 16, 1952 L. F. R. FELL ET AL 2,610,526
TRANSMISSION GEARING
Filed April 25, 1949 3 Sheets-Sheet 3

INVENTORS
Louis F. R. Fell
Richard J. W. Cousins
by Jax Jennine Atty.

Patented Sept. 16, 1952

2,610,526

UNITED STATES PATENT OFFICE 2,610,526

TRANSMISSION GEARING

Louis Frederick Rudston Fell, Littleover, and Richard Joseph Walsh Cousins, Shoreham-by-Sea, England, assignors to Fell Developments Limited, London, England, a British company Application April 25, 1949, Serial No. 89,424
In Great Britain May 4, 1948

13 Claims. (Cl. 74—675)

This invention relates to transmission gearing for a multiple engine power unit such as is described in the specifications accompanying applications numbered 693,613, filed August 29, 1946, and 793,903, now Patent No. 2,589,788.

In one form of this power unit, the output from each engine passes through a variable-filling fluid coupling to a differential gear. A unidirectional brake is associated with the transmission from each engine and its corresponding sun wheel in the differential gear. Two engines are thus associated with each differential gear and the combined output from these two engines is taken from the planet carrier of the differential gear. In the case of a power unit with more than one pair of engines, a further differential gear or gears is or are required to combine the output from pairs of associated engines in the same way as the outputs of individual engines of a pair are combined. The main function of the unidirectional brakes is to prevent one sun wheel of a differential from rotating in the reverse direction when it is not receiving power from its associated engine and power is being received by the other sun wheel of the same differential gear, it being assumed that the power unit is under load. In the prior specifications referred to above, one form of the unidirectional brake device is a self-wrapping frictional brake. It is necessary that the unidirectional brake should be automatic in action in order that the failure of one engine may not prevent the output of the remaining engines from being effective and to protect the engine which is not running from being rotated backwards.

Circumstances may arise, however, where it is desirable to remove a load from the transmission gearing when it is stationary. Such circumstances occur when the reversing mechanism of the transmission gearing is required to be operated and the transmission gearing is under load, for example when the power unit is embodied in a locomotive which is set back on to a train in such a manner as to compress the buffer springs which, as soon as the drive from the locomotive ceases, tend to force the locomotive in the reverse direction to that in which it has been operated. As a result of this, the unidirectional brakes of the locomotive will be brought into operation and the transmission gearing will be placed under load and it will be extremely difficult to operate the forward-reverse mechanism of the transmission gearing, an operation which is essential before the locomotive can move off again with the train.

The principal object of the present invention is to provide means for releasing the load on the transmission gearing when desired, in order to avoid difficulties of the type just described.

Another object of the present invention is to provide means for improved control of the transmission gearing when the power unit is running on less than the total number of individual engines.

Thus transmission gearing for a power unit having two internal combustion engines, a differential gear so arranged that each of said engines drives a sun wheel of this differential gear through a variable filling fluid coupling, a unidirectional device associated with the transmission from each engine and the corresponding sun wheel and means for transmitting power from the planet carrying member of the said gear to the mechanism to be driven by the power unit, comprises, according to the present invention, means for releasing the abutment member of one of the unidirectional devices.

It should be noted that when the power unit comprises more than two main engines, one unidirectional device will still serve to remove the load from the stationary transmission.

By this means it is possible to release the load on the transmission gearing when stationary and thus, in the case where a locomotive has been set back on to a train as indicated above, to operate the reverse mechanism of the transmission gear with ease.

The releasable abutment also offers a useful additional control when running.

The invention further consists in the new or improved features, arrangements and combinations of parts embodied in the preferred form of the invention which it is now proposed to describe in some detail in the accompanying drawings in which Figure 1 is a side elevation of a railway locomotive embodying a four engined power unit of the type referred to, in which the major portion of the external cowling has been broken away to show the main elements of the power unit (various subsidiary components of the locomotive having been omitted for the sake of simplicity).

Figure 2 shows a plan view of the locomotive shown in Figure 1 (all cowling having been removed).

Figure 3 is a diagrammatic plan view drawn to a different scale from Figures 1 and 2 showing the arrangement of the differential gears and unidirectional devices in the form of unidirectional brakes associated with the four engined power unit of Figures 1 and 2.

Figures 4, 5:
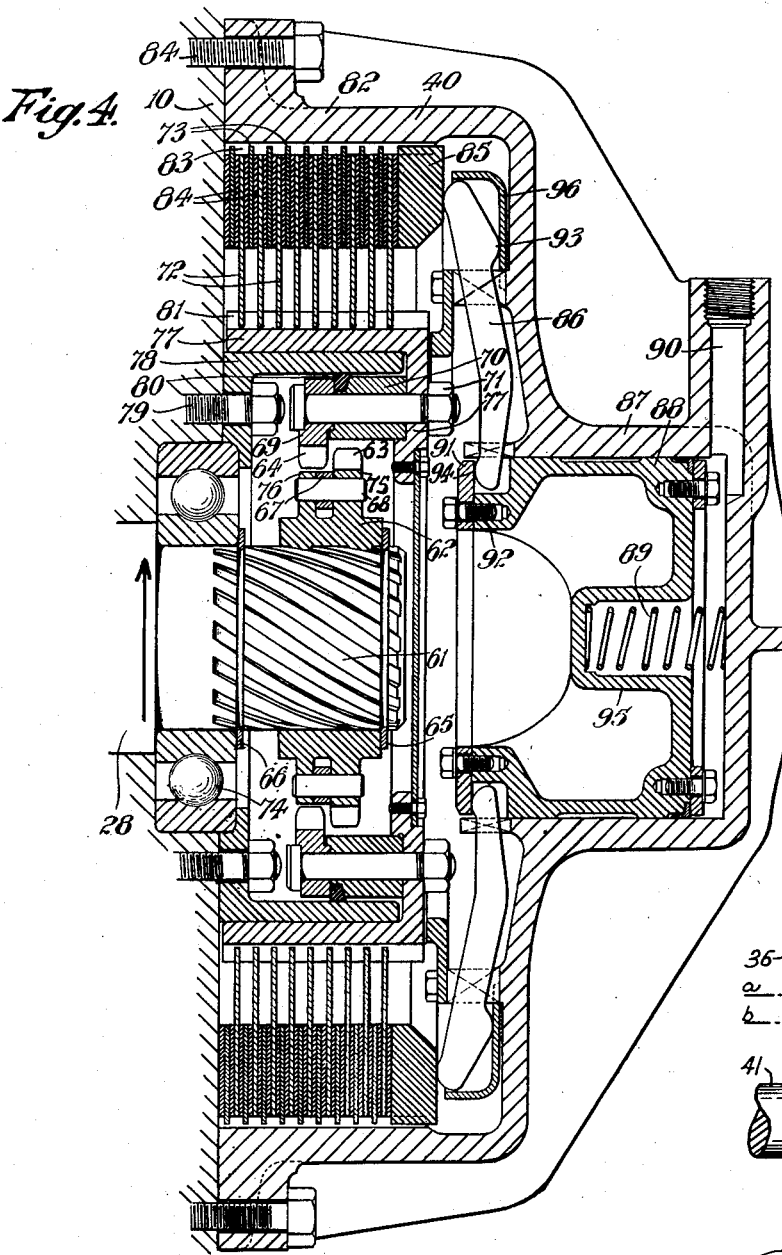
Figure 4 is a part sectional elevation on an enlarged scale showing the unidirectional brake having a releasable abutment.
Figure 5 is a sectional elevation, with certain parts omitted for simplicity, on an enlarged scale showing the mechanism of the differential gears of Figure 3.

Referring now to Figures 1 and 2, there is here shown a locomotive having four internal combustion engines A, B, C and D situated in pairs near the ends of the locomotive chassis. Associated with the engines A, B, C and D are variable filling fluid couplings 13, 14, 17 and 18 respectively and each of these couplings is connected through shafts 5, 6, 7 and 8 respectively to a gear box 10 placed centrally in the locomotive chassis. In this gear box 10 drive from each of the four engines A, B, C and D is combined and transmitted to the wheels of the locomotive via a gear train J (Figure 1).

Torsional-vibration damping devices A1, A2, B1, B2, C1, C2, D1 and D2 are interposed between the various engines A, B, C and D respectively and the associated fluid couplings 13, 14, 17 and 18.

Engines A, B, C and D are supercharged as indicated in the prior specifications by means of auxiliary engines E and F, which drive blowers G and H respectively. Conduits K and L which are interconnected convey the output of the blowers G and H to the appropriate main engines.

The arrangement is thus comparable to that shown in the earlier specifications referred to, except that no frictional unidirectional brakes are employed. Reverse rotation of any one of the engines A, B, C or D is prevented by means of unidirectional brakes 37, 38, 39 and 40 respectively; the brakes are mounted on the gear box 10 and their function will be explained below.

Referring now to Figure 3, it will be noted that the shafts 5, 6, 7 and 8 transmit the drive by means of bevel gears 5', 6', 7' and 8', respectively, to differential shafts 25, 26, 27 and 28 respectively. Shafts 25 and 26 on the one hand and shafts 27 and 28 on the other hand are arranged as co-axial pairs. Shafts 25 and 26 are secured to the two sun wheels of a differential gearing 29 which is of the planetary type. Shafts 27 and 28 are similarly connected by means of the planetary differential 31. A gear wheel 32 secured to the planet carrier of differential 29, and a gear wheel 34 secured to the planet carrier of differential 31 engage gear wheels 33 and 35 respectively mounted on shafts 41 and 42, which shafts are also arranged as a co-axial pair and connected to the sun wheels of a planetary differential 30. A power take-off element, such as the gear 36, is secured to the planet carrier of the differential 30 and receives the combined output from the four main engines A, B, C and D to drive the wheels of the locomotive through a suitable gear train J (Figure 1).

The mechanism of the differentials 29, 30 and 31 is essentially the same and is illustrated by Figure 5 which shows a sectional elevation of the differential 30. The shafts 41 and 42 have tooth wheels 201 and 202 respectively, fixedly mounted on their oppositely facing ends. Planet wheels 203 and 204 are mounted in the casing 30. The planet wheel 204 rotates upon bearings carried by the stud 205. A similar stud carrying the planet wheel 203 has been omitted in the interests of clarity but its axis of rotation has been indicated by the broken line b—b. The axis of rotation of the planet wheel 204 is indicated by the broken line a—a. The planet wheel 204 engages with the tooth wheel 202 and also with the planet wheel 203. The planet wheel 203 engages with the tooth wheel 201. It will be appreciated that a number of pairs of planet wheels, such as 203 and 204, the teeth of which engage with each other and with one of the wheels 201 and 202, will be symmetrically disposed within the casing 30 around the common axis of the shafts 41 and 42. For example, three such pairs of planet wheels may be employed. The gear 36 is secured to the casing 30 by means of bolts 206.

Reverse rotation of each of the shafts 25, 26, 27 and 28, and hence of the engines A, B, C and D respectively is prevented by means of unidirectional devices or brakes 37, 38, 39 and 40.

The unidirectional brakes 37, 38 and 39 all operate in a similar fashion so that the following description of the brake 39 applies to the other two brakes 37 and 38.

One end of shaft 27, or a shaft 25, 26, or 28, extends through the wall of the gear box 10, where it is supported in a suitable bearing, and the end of the shaft outside the gear box is provided with helical splines 51. A disc-like member 52 having internal splines mating with the splines 51 is carried on this extension of the shaft 27. This member 52 carries a series of peripheral dogs 53 which may be brought into engagement with a stationary set of dogs 54 carried by the body of the brake 39 which is rigidly secured to the gear box 10. An enlarged terminal portion or stop 55 of the shaft 27 and a circlet or stop 56 carried by the shaft 27 serve as stops to limit the movement of the member 52.

When the shaft 27 rotates in the direction indicated by the arrows at the associated bevel gears, the inertia of the member 52 combined with the action of the splines 51 and the mating internal splines on the member 52 urge this member towards the right as shown in Figure 3. When, however, the shaft 27 starts to rotate in the opposite direction (which would involve reverse rotation of the associated main engine C), the effect of the splines and the inertia of the member 52, assisted by the action of pawls 67 or other retarding means (see Figure 4 and associated description below) to induce relative rotation between the member 52 and the splined end 51 of the shaft 27, causes the member 52 to move towards the left as shown in Figure 3 as far as the stop 55 permits; in this position the dogs 53 and 54 engage and prevent all further rotation in this direction.

Reverse rotation of the main engine C is thus prevented; the small amount of reverse movement of the shaft 27 is better appreciated from the following description of Figure 4.

Figure 4 shows the unidirectional brake 40 in greater detail than it appears in Figure 3 and since the operation of this brake, apart from its releasable abutment, is the same as that of brake 39, Figure 4 may be taken as further illustrating, in some respects, the operation of this latter brake. To this end parts of the brake 40 in Figure 40 corresponding to parts of the brake 39 in Figure 3 have reference numerals of the same terminal digit: the first digit being 6 instead of 5.

Figure 4 shows the end of the shaft 28 or a shaft 25, 26, or 27, extending through the gear box 10, where it is supported by a bearing 74, and provided with helical splines 61 which mate with internal splines on a member 62 mounted on the shaft extension. This member 62 is provided with two circumferential flanges 75 and 76 which are provided with a plurality of registering apertures to accommodate pins 68. On each pin 68 is mounted a light pawl 67.

A set of dogs 64 is arranged round the inner periphery of an annulus 69 which is assembled with a second annulus 70 and a drum 77 by means of bolts 71. The drum 77 fits over a second drum 78 bolted to the gear box 10 by bolts 79. A ring 80, which may be of soft metal is assembled between the annuli 69 and 70 and locates the annuli 69, 70—drum 77 assembly in relation to a drum 78.

The exterior of the drum 77 is provided with splines 81 which mate with internal splines on a plurality of clutch or friction plates 72. A cylindrical casing 82, secured to the gear box 10 by bolts 84, houses the releasable-abutment unidirectional brake 40 and is provided with splines 83 on its interior surface. These splines 83 mate with external splines on a plurality of clutch or friction plates 73 which are assembled in alternate relationship with the clutch or friction plates 72 and with interposed plates 84 of frictional material and a pressure plate 85 to form a multiple-plate brake of known type.

A portion 87 of reduced diameter, of the casing 82 is formed as a cylinder in which a piston 88 moves. A conduit 90 connects the cylinder 88 with a source of vacuum. This piston is urged to the left as shown in Figure 3 by a helical spring 89 accommodated within a recessed portion 95 of the crown of the piston 87, and abutting against the head of the cylinder 88.

An annulus 91 secured to the skirt of the piston 88 by a plurality of bolts 92, co-operates with a plurality of levers 86 by forming an abutment for the toe 94 of each lever 86. Each lever 86 engages the pressure plate 85 with its end remote from the toe 94, and is arranged to turn about a heel portion 93 which engages an annular member 96 fixed to the casing 82, which locates the levers 86. The assembly of the annuli 67 and 70 and drum 77 thus forms the releasable abutment of the unidirectional brake 40.

Under normal conditions of locomotive operation, the cylinder 87 is always connected to a source of vacuum by the conduit 90, and the piston 88 is thus urged to the right as shown in Figure 4 and accordingly exerts, through annulus 91 a pressure on the toes 94 of the levers 86 which causes the remote ends of their levers 86 to press upon the pressure plate 85 and thus to engage the multiple plate brake comprising the assembly of plates 73, 72 and 84. The result of this brake engagement is to hold the drum 77, and hence the set of dogs 64, stationary in relation to the gear box 10.

Under normal conditions of running in the forward direction, indicated by the arrow on the shaft 28, the effect of the splines 61 and the internal splines on the member 62, is to urge this member to the position shown in Figure 4 where it is as far to the right as possible, against a stop 65. Under these conditions the pawls 67 run freely over the dogs 64.

As soon as there is any reverse rotation of the shaft 28 the pawls 67 will engage with the dogs 64 to prevent the member 62 rotating with the shaft 28; under these conditions the member 62 moves to the left as shown in Figure 4 to the extent permitted by the stop 66, and the dogs 63 thus engage with the dogs 64. The member 62 is thus held stationary and the mating of the splines 61 with the internal splines of the member 62 holds the shaft 28 stationary and hence prevents any further reverse rotation. It will be appreciated by observing the pitch of the helical splines and the short distance that the member 62 has to move to produce engagement of the dogs 63 and 64, that reverse rotation of the shaft 28 can only take place to a very limited degree. This description of the engagement of the dogs 63 and 64 as a result of the action of the associated pawls and splines applies to the other unidirectional brakes 37, 38 and 39.

If it is desired to release the set of dogs 64, for example to enable forward-reverse gearing to be operated as indicated above, the vacuum acting on the piston 88 is destroyed and this piston then moves to the left as shown in Figure 4 under the influence of the spring 89, thus turning the levers 86 about their heels 93 and so releasing the multiple plate brake. The assembly of annuli 69 and 70 and drum 77 is now free to turn with the shaft 28. In the case of stationary transmission gearing under load, the shaft 28 will undergo reverse rotation sufficient to remove the load from the shafts 25, 26, 27, 41 and 42 and the associated differential gears 29, 30 and 31.

It will be appreciated that the present invention is not limited to the combination of cylinder 87, piston 88 and levers 86 for operating the multiple plate brake. Thus, a plurality of vacuum-connected cylinders may be arranged in a substantially circular formation opposite to the pressure plate 85, the piston of each cylinder having a piston rod which, after passing through a stuffing box, bears directly on the pressure plate 85.

It is to be noted that the use of a multiple plate clutch or brake to release the abutment of a unidirectional brake is only described by way of example and that the present invention is not limited to the use of a multiple plate clutch or brake.

It will be appreciated that the releasable abutment may be combined with other forms of unidirectional brakes or clutch and may be combined with the type of unidirectional brake illustrated in the specification accompanying application Number 793,903.

It will further be appreciated that when running the locomotive on less than the total number of engines, provided that it is not running with the assistance of the engine D associated with the unidirectional brake 40 having a releasable abutment, it is possible to effect immediate interruption of power supply to the driving wheels without waiting for the fluid couplings 13, 14, and 17 to be emptied, or for engine revolutions to fall to idling speed, by releasing the abutment of the unidirectional clutch 40. The sun wheel of differential gear 31 associated with the shaft 28 will then rotate freely in the reverse direction and prevent any output from being taken from the gear 36. The releasable abutment thus provides an additional running control.

The term "unidirectional device" as used herein includes any device for the one-way transmission of power.

The variable filling coupling described herein may be replaced by any clutch of similar characteristics without departing from the scope of the present invention.

We claim:

1. A power plant comprising two internal combustion engines, a bed supporting said engines and transmission gearing arranged between said engines and mechanism to be driven by said power plant, said transmission gearing comprising, in association with each of said engines, a fluid coupling and a unidirectional device including a normally rotatable member and a cooperating abutment member adapted to be engaged by said rotatable member upon a reverse rotation of said rotatable member, a differential gear comprising two sun wheels, a plurality of planet wheels engaging said sun wheels and a planet carrier supporting said planet wheels, transmission means including said fluid coupling to convey drive from each one of said engines to one of said sun wheels, further transmission means for transmitting drive from said planet carrying member to a mechanism to be driven by said power unit and means for releasing one of said abutment members for movement in relation to said bed, so that on release of said abutment member, rotation in a direction opposite to the previous engine driven direction, of said further transmission means, said planet carrying member and the sun wheel associated with said releasable abutment member may take place.

2. A power plant comprising two internal combustion engines, a bed supporting said engines and transmission gearing arranged between said engines and mechanism to be driven by said power plant, said transmission gearing comprising, in association with each of said engines, a fluid coupling and a unidirectional device including a normally rotatable member and a cooperating abutment member adapted to be engaged by said rotatable member upon a reverse rotation of said rotatable member, a differential gear comprising two sun wheels, a plurality of planet wheels engaging said sun wheels and a planet carrier supporting said planet wheels, transmission means including said fluid coupling to convey drive from each one of said engines to one of said sun wheels, further transmission means for transmitting drive from said planet carrying member to a mechanism to be driven by said power unit and a multiple plate brake arranged to secure one of said abutment members in relation to said bed, or to release said abutment member for movement in relation to said bed as required, so that on release of said abutment member, rotation, in a direction opposite to the previous engine driven direction, of said further transmission means, said planet carrying member and the sun wheel associated with said releasable abutment member, may take place.

3. A power plant comprising two internal combustion engines, a bed supporting said engines and transmission gearing arranged between said engines and mechanism to be driven by said power plant, said transmission gearing comprising, in association with each of said engines, a fluid coupling and a unidirectional device including a normally rotatable member and a cooperating abutment member adapted to be engaged by said rotatable member upon a reverse rotation of said rotatable member, a differential gear comprising two sun wheels, a plurality of planet wheels engaging said sun wheels and a planet carrier supporting said planet wheels, transmission means including said fluid coupling to convey drive from each one of said engines to one of said sun wheels, further transmission means for transmitting drive from said planet carrying member to a mechanism to be driven by said power unit, a multiple plate brake arranged to secure one of said abutment members in relation to said bed, or to release said abutment member for movement in relation to said bed as required and fluid pressure means for operating said multiple plate brake to release said abutment member.

4. A power plant comprising two internal combustion engines, a bed supporting said engines and transmission gearing arranged between said engines and mechanism to be driven by said power plant, said transmission gearing comprising, in association with each engine, a fluid coupling and a positively locking unidirectional device, said unidirectional device including an abutment member and a rotatable member normally rotating when said associated engine is operating, arranged to lock positively with said abutment member when reverse rotation is initiated, a differential gear comprising two sun wheels, a plurality of planet wheels engaging said sun wheels and a planet carrying member supporting said planet wheels, transmission means including said fluid coupling to convey drive from each one of said engines to one of said sun wheels, further transmission means for transmitting drive from said planet carrying member to the mechanism to be driven by said power unit and a multiple plate brake arranged to secure one of said abutment members in relation to said bed, or to release said abutment member for movement in relation to said bed as required, so that on release of said abutment member, rotation, in a direction opposite to the previous engine driven direction, of said further transmission means, said planet carrying member and the sun wheel associated with said releasable abutment member, may take place.

5. A power plant comprising two internal combustion engines, a bed supporting said engines and transmission gearing arranged between said engines and mechanism to be driven by said power plant, said transmission gearing comprising, in association with each engine, a fluid coupling and a positively locking unidirectional device, said unidirectional device including an abutment member and a rotatable member normally rotating when said associated engine is operating, arranged to lock positively with said abutment member when reverse rotation is initiated, a differential gear comprising two sun wheels, a plurality of planet wheels engaging said sun wheels and a planet carrying member supporting said planet wheels, transmission means including said fluid coupling to convey drive from each one of said engines to one of said sun wheels, further transmission means for transmitting drive from said planet carrying member to the mechanism to be driven by said power unit, a multiple plate brake arranged to secure one of said abutment members in relation to said bed, or to release said abutment member for movement in relation to said bed as required, and fluid pressure means for operating said multiple plate brake to release said abutment member, so that on release of said abutment member, rotation, in a direction opposite to the previous engine driven direction, of said further transmission means, said planet carrying member and the sun wheel associated with said releasable abutment member, may take place.

6. A power plant comprising two internal combustion engines, a bed supporting said engines and transmission gearing arranged between said engines and mechanism to be driven by said power plant, said transmission gearing comprising, in association with each of said engines, a fluid coupling and a unidirectional device including a normally rotatable member and a cooperating releasable abutment member adapted to be engaged by said rotatable member upon a reverse rotation of said rotatable member, a differential gear comprising two sun wheels, a plurality of planet wheels engaging said sun wheels and a planet carrier supporting said planet wheels, transmission means including said fluid coupling to convey drive from each one of said engines to one of said sun wheels, further transmission means for transmitting drive from said planet carrying member to the mechanism to be driven by said power unit and means for automatically releasing one of said abutment members for movement in relation to said bed when the associated engine is at idling speed whereby on release of said abutment member rotation of said further transmission means, said planet carrying member and the sun wheel of the associated releasable abutment member may take place.

7. A power plant as claimed in claim 6 in which said means for automatically releasing one of said abutment means comprises a brake and vacuum operated means for operating said brake.

8. A power plant comprising two internal combustion engines, a bed supporting said engines and transmission gearing arranged between said engines and mechanism to be driven by said power plant, said transmission gearing comprising, in association with each engine, a fluid coupling and a positively locking unidirectional device, said unidirectional device including a releasable abutment member and a rotatable member, normally rotating when said associated engine is operating, arranged to lock positively with said abutment member when reverse rotation is initiated, a differential gear comprising two sun wheels, a plurality of planet wheels engaging said sun wheels and a planet carrying member supporting said planet wheels, transmission means including said fluid coupling to convey drive from each one of said engines to one of said sun wheels, further transmission means for transmitting drive from said planet carrying member to the mechanism to be driven by said power unit and means for releasing one of said abutment members for movement in relation to said bed, so that on release of said abutment member, rotation in a direction opposite to the previous engine driven direction, of said further transmission means said planet carrying member and the sun wheel associated with said releasable abutment member may take place.

9. A power plant comprising two internal combustion engines, a bed supporting said engines and transmission gearing arranged between said engines and mechanism to be driven by said power plant, said transmission gearing comprising, in association with each engine, a fluid coupling and a positively locking unidirectional device, said unidirectional device includng an abutment member and a rotatable member normally rotating when said associated engine is operating, arranged to lock positively with said abutment member when reverse rotation is initiated, a differential gear comprising two sun wheels, a plurality of planet wheels engaging said sun wheels and a planet carrying member supporting said planet wheels, transmission means including said fluid coupling to convey drive from each one of said engines to one of said sun wheels, further transmission means for transmitting drive from said planet carrying member to the mechanism to be driven by said power unit and means for automatically releasing one of said abutment members when the associated engine is at idling speed for movement in relation to said bed, so that on release of said abutment member, rotation in a direction opposite to the previous engine driven direction, of said further transmission means, said planet carrying member and the sun wheel associated with said releasable abutment member may take place.

10. A power plant as claimed in claim 5 in which vacuum operated means are provided for operating said multiple plate brake.

11. A power plant comprising four internal combustion engines, a bed supporting said engines, and transmission gearing arranged between said engines and mechanism to be driven by said power plant, said transmission gearing comprising, in association with each of said engines, a fluid coupling and a unidirectional device including a normally rotatable member and a cooperating abutment member adapted to be engaged by said rotatable member upon a reverse rotation of said rotatable member, two primary differential gears each comprising two sun wheels, a plurality of planet wheels engaging said sun wheels and a planet carrier supporting said planet wheels, transmission means including said fluid coupling to convey drive from each one of said engines to one of said sun wheels, a secondary differential gear comprising two sun wheels, a plurality of planet wheels engaging said sun wheels, a planet carrier for supporting said planet wheels, each of said sun wheels of said secondary differential gear being operatively connected with a planet carrier of said primary differential gears, further transmission means for transmitting drive from said planet carrying member of said secondary differential gear to the mechanism to be driven by said power unit and means for releasing one of said abutment members for movement in relation to said bed, so that on release of said abutment member, rotation in a direction opposite to the previous engine driven direction, of said further transmission means, said planet carrying member and the sun wheel associated with said releasable abutment member may take place.

12. A power plant comprising four internal combustion engines, a bed supporting said engines and transmission gearing arranged between said engines and mechanism to be driven by said power plant, said transmission gearing comprising, in association with each engine, a fluid coupling and a positively locking unidirectional device, said unidirectional device including an abutment member and a rotatable member normally rotating when said associated engine is operating, arranged to lock positively with said abutment member when reverse rotation is initiated, two primary differential gears each comprising two sun wheels, a plurality of planet wheels engaging said sun wheels and a planet carrying member supporting said planet wheels, transmission means including said fluid coupling to convey drive from each one of said engines to one of said sun wheels, a secondary differential gear comprising two sun wheels, a plurality of planet wheels engaging said sun wheels, a planet carrier for supporting said planet wheels, each of said sun wheels of said secondary differential gear being operatively connected with a planet carrier of said primary differential gear, further transmission means for transmitting drive from said planet carrying member of said secondary differential gear to the mechanism to be driven by said power unit and means for releasing one of said abutment members, for movement in relation to said bed, so that on release of said abutment member, rotation in a direction opposite to the previous engine driven direction, of said further transmission means said planet carrying member and the sun wheel associated with said releasable abutment member may take place.

13. A power plant as claimed in claim 12 comprising in addition a gear box, said primary and secondary differential gears being housed within said gear box and said unidirectional devices being supported externally of said gear box.

LOUIS FREDERICK RUDSTON FELL.
RICHARD JOSEPH WALSH COUSINS.

REFERENCES CITED

The following references are of record in the file of this patent:

UNITED STATES PATENTS

| Number | Name | Date |
|---|---|---|
| 1,315,962 | Hussander | Sept. 16, 1919 |
| 1,720,007 | Schuler | July 9, 1929 |
| 1,892,940 | Erdahl | Jan. 3, 1933 |
| 2,223,715 | Berger | Dec. 3, 1940 |
| 2,292,776 | Sinclair | Aug. 11, 1942 |
| 2,366,646 | Orr | Jan. 2, 1945 |
| 2,417,198 | Hindmarch | Mar. 11, 1947 |
| 2,448,678 | McFarland | Sept. 7, 1948 |